United States Patent [19]

Wilson

[11] Patent Number: 6,090,429

[45] Date of Patent: *Jul. 18, 2000

[54] PROCESS FOR THE MANUFACTURE OF A LACTITOL SYRUP

[75] Inventor: Lonny Lee Wilson, Quincy, Ill.

[73] Assignee: Roquette Freres, Lestrem, France

[*] Notice: This patent issued on a continued prosecution application filed under 37 CFR 1.53(d), and is subject to the twenty year patent term provisions of 35 U.S.C. 154(a)(2).

[21] Appl. No.: 08/828,024

[22] Filed: Mar. 27, 1997

[51] Int. Cl.⁷ ..................... A23L 1/236
[52] U.S. Cl. .............. 426/548; 426/549; 426/555; 127/36; 127/44; 127/46.1; 127/67
[58] Field of Search ................ 426/548, 549, 426/555; 127/46.1, 42, 44, 67, 36

[56] References Cited

U.S. PATENT DOCUMENTS

| | | | |
|---|---|---|---|
| 5,376,389 | 12/1994 | Reed et al. | 426/5 |
| 5,436,329 | 7/1995 | Caboche | 536/103 |
| 5,527,554 | 6/1996 | Olinger et al. | |

FOREIGN PATENT DOCUMENTS

| | | |
|---|---|---|
| 2255694 | 10/1990 | Japan. |
| 90/06317 | 6/1990 | WIPO. |
| 92/16542 | 10/1992 | WIPO. |

OTHER PUBLICATIONS

Linko et al. in Carbohydrate Sweeteners in Food and Nutrition (1980), Eds Koivistoineu, P. and Hyvonen, L., Academic Press, New York, 243–57.

*Primary Examiner*—Milton Cano
*Assistant Examiner*—Hao Mai
*Attorney, Agent, or Firm*—Henderson & Sturm LLP

[57] ABSTRACT

A process for the manufacture of a lactitol syrup that involves subjecting a mixture of lactose and an hydrolysate of inulin or of starch to catalytic hydrogenation.

20 Claims, No Drawings

PROCESS FOR THE MANUFACTURE OF A LACTITOL SYRUP

BACKGROUND OF THE INVENTION

1. Field of the Invention

The present invention relates to a new process for the manufacture of a lactitol syrup.

2. Description of the Related Art

4-O-beta-D-Galactopyranosyl-D-glucitol, commonly called lactitol, is a polyol which is of great interest because is more chemically stable and lower in calories than sucrose, while advantageously possessing the property of being suitable in the diet of diabetics. Furthermore, lactitol has the characteristic feature of not being cariogenic, which paves the way, and has already done so, for it in multiple applications in industry, especially in the food and pharmaceutical industries.

Lactitol is generally marketed in the form of a crystalline powder. Its crystallography is particularly complex if reference is made to its literature, from which it is apparent that this polyol can crystallize in different monohydrate, dihydrate or even trihydrate anhydrous forms. Also, it should be noted that lactitol can crystallize in different states of hydration and in forms which are stable to a greater or lesser degree and that several crystalline forms generally exist for this polyol for the same state of hydration.

However, the number of known crystalline forms of lactitol is in no way comparable to that known for other sugars or polyols. For example, only one crystalline form is known to date for sucrose, xylitol, erythritol or maltitol and only two or three crystalline forms for, for example, dextrose, lactose, maltose and mannitol.

Although not wishing to be bound by any particular theory, this is believed to explain why, in the case of lactitol, it has always been difficult, contrary to other sugars and polyols, to obtain essentially a single crystalline form uncontaminated by other forms. To date, controlling the crystallization remains unsatisfactory as demonstrated, in particular, in the recently published documents WO-A-92/16542 and JP-A-2,255,694 or WO-A-90/06317.

In a number of cases, and regardless of the lactitol crystalline form finally obtained, the lactitol is redissolved with other polyols so as to form a lactitol syrup which is increasingly used as sweetening composition or as texturing agent in products intended to be ingested by men or animals.

"Products intended to be ingested by man or animals" which may also be referred to as "edible products" is understood to mean products intended for ingestion and for oral administration, such as various food products such as confectionery, pastries, creams, beverages, jams, sauces, ice creams or ice cream-based desserts, prepared animal fodder, as well as pharmaceutical, dietetic or health care products such as for example elixirs, cough syrups, lozenges or tablets, chewy pastes, chewing gums, pastilles, oral health solutions, dentifrices in paste, gel or liquid form or veterinary products.

In most of these applications, the lactitol is very often combined with starch hydrolysates or with glucose syrups, which are hydrogenated. In the remainder of the text of the specification, the terms glucose syrup or starch hydrolysate may be used interchangeably. Likewise, the terms inulin syrup or inulin hydrolysate may be used interchangeably. The mixture thus prepared is generally used to replace the sucrose/glucose syrup pair. Indeed, by virtue of its taste, its texture, its organoleptic, low-calorie and non-cariogenic qualities, as well as its characteristics of hardness, melting and the like, such a mixture exhibits characteristics which are advantageously comparable to those of traditional products sweetened with sucrose and glucose syrups.

To take only one recent example of the use of a lactitol/hydrogenated starch hydrolysates or hydrogenated glucose syrups mixture, there may be mentioned the document U.S. Pat. No. 5,527,554 which describes a deep-frozen dessert with a reduced calorie content comprising from 0 to 12% fat, from 5 to 15% lactitol, from 5 to 15% of a hydrogenated starch hydrolysate, from 7 to 17% dehydrated milk, from 0.01 to 0.5% of an intense sweetener, and water.

The raw material for producing the lactitol is lactose or 4-O-beta-D-galactopyranosyl-D-glucose. Lactitol is obtained industrially by hydrogenation of a solution of lactose at about 100° C. over a Raney nickel catalyst and at a hydrogen pressure of about 40 bar. Because of the low solubility of lactose (compared with glucose), the hydrogenation of a lactose solution can only be achieved, under satisfactory conditions, at low concentrations of the order of 300 to 400 g/l.

Indeed, in practice, the hydrogenation of a lactose solution occurs at most at around 30% dry matter content because, above this value, problems of viscosity due to a less efficient stirring cause a drop in the hydrogenation yield.

This limit to the initial lactose concentration has in fact been demonstrated by Linko et al. in "Carbohydrate Sweeteners in Food and Nutrition (1980), Eds Koivistoineu, P. and Hyvonen, L., Academic Press, New York, 243–57". These authors determined that catalytic hydrogenation over Raney nickel of a lactose solution was optimum when a lactose solution at 30% dry matter content was used as starting material and when the procedure was carried out at 100° C. at a pressure of about 90 bar.

It could be thought that this initial lactose concentration limit of about 30% dry matter content could be easily increased by carrying out the hydrogenation at higher temperatures and pressures. But these same authors, in the same document, have shown that under higher temperature and pressure conditions, the lactitol yield is much lower because the hydrogenation is accompanied by the formation of secondary products. The latter are, on the one hand, lactulose which results from the isomerization of lactose, and on the other hand, lactose and glucose which result from the hydrolysis of lactose, all these secondary products being, moreover, hydrogenated into the corresponding polyols.

From the preceding text, it can be understood that the industrial manufacture of crystallized lactitol exhibits several disadvantages, including:

that of not being very efficient because of the relatively low dry matter content of the starting product, close to 300 g/l, which is necessary to obtain the highest possible hydrogenation efficiency;

that of not being very selective in the crystalline form obtained because of the unsatisfactory control of the crystallization of the lactitol.

BRIEF SUMMARY OF THE INVENTION

The object of the present invention is therefore to provide a new process for the manufacture of a lactitol syrup which overcomes the limitations and/or disadvantages of those known in the state of the art.

Another object of the invention is to provide a process for the manufacture of a lactitol syrup which does not require the use of a lactitol crystallization step.

To this end, the invention relates to a process for the manufacture of a lactitol syrup, characterized in that a mixture of lactose and a hydrolysate of starch or of inulin is subjected to catalytic hydrogenation.

Briefly, the present invention is directed to a process for the manufacture of a lactitol syrup, wherein the process involves forming a mixture comprising lactose and at least one member selected from the group consisting of an hydrolysate of inulin and an hydrolysate of starch; and subjecting the mixture to catalytic hydrogenation using a catalyst and an hydrogenation medium under a pressure and at a temperature suitable for hydrogenating lactose to lactitol resulting in a lactitol syrup.

The present invention is also directed to a lactitol syrup produced by the process of the present invention described above.

The present invention is also directed to a process for making a dehydrated lactitol product, wherein the process involves forming a mixture comprising lactose and at least one member selected from the group consisting of an hydrolysate of inulin and an hydrolysate of starch; subjecting the mixture to catalytic hydrogenation using a catalyst and an hydrogenation medium under a pressure and at a temperature suitable for hydrogenating lactose to lactitol resulting in a lactitol syrup; and spray drying the lactitol syrup.

The present invention is also directed to a dehydrated lactitol product produced by the process of the present invention described above.

The present invention is also directed to a sweetening composition comprising a lactitol syrup produced by a process of the present invention as described above.

The present invention is also directed to a method of using a lactitol syrup produced by a process of the present invention as described above, as an anticrystallizing agent for polyols, wherein the method involves adding the lactitol syrup to a polyol in an effective amount to reduce crystallization of the polyol.

The present invention is also directed to a method of using a lactitol syrup produced by a process of the present invention as described above, as a texturing agent in edible products, wherein the method involves adding the lactitol syrup to edible products in an effective amount to texturize the edible products.

DETAILED DESCRIPTION OF THE INVENTION

Applicant has succeeded, against all expectations, after having carried out detailed research on the subject, in developing a new process for the manufacture of a lactitol syrup not exhibiting the faults, disadvantages or limitations observed for the known manufacturing processes. It has demonstrated, surprisingly and unexpectedly, that by mixing lactose with inulin or starch hydrolysates, the initial concentrations of lactose used could rise well above 30% dry matter content without, as a result, observing a drop in the hydrogenation yield or the appearance of secondary products.

Although not wishing to be bound by any particular theory, an explanation for this phenomenon could be that by mixing lactose with inulin or starch hydrolysates, advantage is taken of their known anti crystallizing effect in increasing the dry matter content of the sugar-containing solutions to be hydrogenated without, as a result, decreasing the yield and selectivity of the hydrogenation.

Another advantage of the invention is that for the same viscosity, mixtures of lactitol and hydrogenated inulin or starch hydrolysate can be concentrated to a dry matter content much higher than lactitol-free hydrogenated inulin or starch hydrolysates. This makes the lactitol syrups in accordance with the invention a lot more economic from the point of view of their transportation.

Thus, by virtue of the process in accordance with the invention:

the volumes to be treated are much smaller than in prior processes, the energy required for the evaporation of the water is substantially reduced, the high osmotic pressures caused by the high concentration of the syrups used protect them from any microbial contamination, it is possible to prepare a ready-for-use lactitol syrup without the need to use an expensive step for crystallization of the lactitol which is known, in addition, to be unsatisfactorily controlled.

Indeed, the use of the process in accordance with the invention makes it possible to avoid, not only the lactitol crystallization step, but also that of the lactose. In accordance with the present invention, therefore, the resultant lactitol syrup is essentially devoid of lactitol crystals. In contrast to the present invention, the processes for the manufacture of lactitol of the state of the art always comprise two crystallization steps: a first of the lactose which is then redissolved so as to be able to be hydrogenated to lactitol, a second of the lactitol obtained from the hydrogenation of lactose.

The first step of the process in accordance with the invention therefore involves mixing lactose with an inulin or starch hydrolysate. In the present invention, glucose syrup is a preferred starch hydrolysate and a lactose/glucose syrup mixture is preferably prepared.

The choice of glucose syrup is made on the basis of the desired properties and of the intended application. The properties of the glucose syrups are essentially governed by two factors.

The first is the average molecular weight, which is the inverse function of the dextrose equivalent (DE).

The second is the carbohydrate spectrum at a given DE value.

By varying these factors by the mode of hydrolysis of the starch, it is therefore possible to obtain a very large number of glucose syrups having diverse and varied properties.

The glucose syrup used in the process in accordance with the invention has a DE of between about 20 and about 80. But if it is desired to hydrogenate a mixture of lactose/glucose syrup having a richness in lactose greater than about 30%, it is preferable to use a glucose syrup having a low DE, of the order of 20 to 40, the anti crystallizing effect of the glucose syrup being optimum for these DE values. The term concentration may be used interchangeably with the term richness as to lactose.

The richness of the mixture in lactose is between 10 and 90%, in particular between 30 and 70%.

The mixture thus obtained may then be catalytically hydrogenated.

Raney nickel catalysts are preferably used for this step.

In practice, 1 to 10% by weight of catalyst is used relative to the dry matter content of the mixture subjected to the hydrogenation. The term solids content may be used interchangeably with dry matter content. The hydrogenation is preferably carried out on syrups whose dry matter or solids content is between about 15% and about 50%, in practice in the region of about 30% to about 45%, at a hydrogen pressure of between about 20 bar and about 200 bar. It may be carried out continuously or batchwise.

When the procedure is carried out batchwise, the hydrogen pressure used is generally between about 30 bar and about 60 bar and the temperature at which the hydrogenation is carried out is between about 100° C. and about 150° C. Care is also taken to maintain the pH of the hydrogenation medium essentially constant by the addition of sodium hydroxide or of sodium carbonate for example, but without exceeding a pH of about 9.0. This manner of proceeding makes it possible to avoid the appearance of products of cracking, isomerization or hydrolysis.

The reaction is stopped when the free reducing sugar content of the reaction medium has become less than about 0.5% and more particularly less than about 0.1%.

After cooling of the reaction medium, the catalyst is removed by filtration and the lactitol syrup thus obtained is demineralized on cationic and anionic resins.

The carrying out of the process in accordance with the invention allows essentially total hydrogenation of the lactose to lactitol, regardless of the initial lactose concentration, with the formation of secondary products in trace amounts only. In accordance with the present invention, substantially all said lactose is hydrogenated to said lactitol.

The lactitol syrup thus obtained may be spray-dried. To this end, the process for making such a dehydrated lactitol product involves forming a mixture comprising lactose and at least one member selected from the group consisting of an hydrolysate of inulin and an hydrolysate of starch; subjecting the mixture to catalytic hydrogenation using a catalyst and an hydrogenation medium under a pressure and at a temperature suitable for hydrogenating lactose to lactitol resulting in a lactitol syrup; and spray drying the lactitol syrup.

The lactitol syrups and spray-dried lactitol are useful in any sweetening composition intended to be ingested by men or animals.

Moreover, surprisingly and unexpectedly, the lactitol syrup obtained by using the process in accordance with the invention has an excellent anti crystallizing power towards polyols which are not very soluble, such as especially xylitol, mannitol or erythritol. Accordingly, a lactitol syrup produced by a process of the present invention as described herein, may be used as an anticrystallizing agent for polyols, by adding the lactitol syrup to a polyol in an effective amount to reduce crystallization of said polyol.

In addition, the lactitol syrup thus obtained may be advantageously used as texturing agent in products intended to be ingested by man or animals. Accordingly, a lactitol syrup produced by a process of the present invention as described herein, may be used as a texturing agent in edible products by adding the lactitol syrup to edible products in an effective amount to texturize the edible products.

The invention will be better understood on reading the example which follows and which is solely intended to better illustrate the invention without wishing to reduce it to the embodiment explicitly described and to the sole lactose/glucose syrup mixture used.

EXAMPLE 1

Hydrogenation of a mixture of lactose and glucose syrup (DE=36–39)

A mixture of lactose and glucose syrup having a richness in lactose of 70% and a dry matter content of 45% is hydrogenated. The composition of the mixture is the following:

70% lactose,
5.2% monosaccharides,
3.9% disaccharides,
3.6% trisaccharides,
17.3% polysaccharides.

The catalyst used is a Raney nickel. The hydrogenation conditions are the following:

5% Raney nickel
Temperature: 140° C.
Hydrogen pressure: 50 bar
Hydrogenation time: 5 hours The hydrogenation is stopped, the catalyst is removed by filtration and the lactitol syrup thus obtained is demineralized on cationic and anionic resins.

A syrup is obtained which contains:

69.5% lactitol
5.5% sorbitol
4% maltitol
3.5% maltotriitol
17.5% hydrogenated polysaccharides.

A trace of galactitol less than 0.1% is detected.

EXAMPLE 2

Use of a lactosehydrogenated glucose syrup mixture in the manufacture of boiled sweets.

The lactitol syrup (69.5% lactitol on a dry basis) produced under the conditions described in Example 1 is used to prepare boiled sweets. For that, the lactitol syrup is dehydrated by boiling over a naked flame and at atmospheric pressure at a temperature of 170° C.

Control sweets are obtained by boiling over a naked flame at atmospheric pressure:

at 155° C. a mixture at 75% dry matter content of a glucose syrup ROCLYS® A3878S marketed by the applicant and sucrose in the respective proportions, on a dry basis, of 45% and 55% (boiled sweets called conventional controls), at 180° C. a maltitol syrup marketed by the applicant under the name LYCASIN® 80/55 (boiled sweets called sugarless controls). Residual water content of the boiled sweets (% Karl Fischer).

Boiled sweets based on lactitol syrup: 2.1%
Conventional controls: 3.1%
Sugarless controls: 1.3%

Stability

To evaluate their stability, the boiled sweets are placed in individual wrappings in an atmosphere at 66% relative humidity in an air-conditioned room at 20° C. The water uptakes are determined by weighing over time.

|  | Water uptake in % after 10 d at 66% RH - 20° C. |
|---|---|
| Sugarless controls | 5.5 |
| Conventional controls | 2.7 |
| Boiled sweet based on lactitol syrup | 2.6 |
|  | Stickiness after 10 d at 66% RH - 20° C. |
| Sugarless controls | Very high |
| Conventional controls | Very slight |
| Boiled sweet based on lactitol syrup | Very slight |

| | Deformation after 10 d at 66% RH - 20° C. |
|---|---|
| Sugarless controls | Very high |
| Conventional controls | Very slight |
| Boiled sweet based on lactitol syrup | Very slight |

It is observed that the sugarless boiled sweets produced from the syrup in accordance with the invention behave in a manner similar to that of conventional sweets of the prior art. Their behavior differs widely, on the other hand, from that of boiled sweets with syrups of the maltitol type LYCASIN® 80/55 (frequently used by sugarless boiled sweet producers) which are particularly hygroscopic and tend to run during water uptake.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

What is claimed is:

1. A process for the manufacture of a lactitol syrup, consisting in the steps of:
   a) forming a mixture consisting of lactose and a glucose syrup; and
   b) subjecting said mixture to catalytic hydrogenation using a catalyst and a hydrogenation medium, under a pressure and at a temperature suitable for hydrogenating lactose, resulting in a lactitol syrup, wherein the dry matter of lactose is at least 30%, and the richness in lactose is comprised between 30% and 90%, and the glucose syrup has a dextrose equivalent of between 20 and 40.

2. The process according to claim 1, wherein said mixture comprises lactose in a concentration of between about 10% and about 90%.

3. The process according to claim 2 wherein said concentration of lactose is greater than about 30%.

4. The process according to claim 3, wherein said concentration of lactose is between about 30% and 70%.

5. The process according to claim 1, wherein said mixture comprises a solids content of between about 15% and about 50%.

6. The process according to claim 4, wherein said solids content is between about 30% and about 45%.

7. The process according claim 6, wherein said pressure is between about 20 bar and about 200 bar.

8. The process according to claim 7, wherein said pressure is between about 30 bar and 60 bar.

9. The process according to claim 1, wherein said temperature is between about 100° C. and about 150° C.

10. The process according to claim 1, comprising maintaining the hydrogenation medium at a constant pH.

11. The process according to claim 9, wherein the pH is at or below a pH of about 9.0.

12. The process according to claim 9, wherein maintaining the hydrogenation medium at a constant pH comprises adding a base to the hydrogenation medium.

13. The process according to claim 12, wherein the base is selected from the group consisting of sodium hydroxide and sodium carbonate.

14. The process according to claim 1, wherein said catalyst comprises Raney nickel catalysts.

15. The process according to claim 5, wherein said catalyst is used in an amount within the range of about 1% to about 10% by weight of the solids content of the mixture.

16. The process according to claim 1, wherein said lactitol syrup comprises a reducing sugar content of less than about 0.5%.

17. The process according to claim 16, wherein said reducing sugar content is less than about 0.1%.

18. The process according to claim 1, wherein all said lactose is hydrogenated to said lactitol.

19. The process according to claim 1, wherein said lactitol syrup is devoid of lactitol crystals.

20. A process for making a dehydrated lactitol product, said process consisting in the steps of:
   forming a mixture consisting of lactose and
   a glucose syrup; and subjecting said mixture to catalytic hydrogenation using a catalyst and a hydrogenation medium under a pressure and at a temperature suitable for hydrogenating lactose, resulting in a lactitol syrup wherein the dry matter of lactose is at least 30% and the richness in lactose is comprised between 30% and 90%, and the glucose syrup has a dextrose equivalent of between 20 and 40 and spray drying said lactitol syrup.

* * * * *